United States Patent
Palin et al.

(10) Patent No.: US 10,945,107 B2
(45) Date of Patent: Mar. 9, 2021

(54) DEVICE PROVISIONING FOR ASSOCIATION WITH A USER OR A USER ACCOUNT

(71) Applicant: NOKIA TECHNOLOGIES OY, Espoo (FI)

(72) Inventors: Arto Palin, Akaa (FI); Jukka Pekka Reunamäki, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/263,720

(22) Filed: Jan. 31, 2019

(65) Prior Publication Data
US 2019/0239043 A1  Aug. 1, 2019

(30) Foreign Application Priority Data
Feb. 1, 2018 (EP) .................................. 18154649

(51) Int. Cl.
*H04W 4/50* (2018.01)
*H04W 8/22* (2009.01)
(Continued)

(52) U.S. Cl.
CPC ............... *H04W 4/50* (2018.02); *G01S 19/37* (2013.01); *H04B 17/318* (2015.01);
(Continued)

(58) Field of Classification Search
CPC ... H04B 17/318; H04L 63/0807; H04L 67/20; G01S 19/37; H04W 4/025; H04W 8/22;
(Continued)

(56) References Cited

U.S. PATENT DOCUMENTS 7,720,018 B2 * 5/2010 Hassan ................. H04W 52/28
370/311
9,693,178 B2 * 6/2017 Adrangi .............. H04L 63/0823
(Continued)

FOREIGN PATENT DOCUMENTS

WO  WO 2016/027000 A1  2/2016
WO  WO 2016/167539 A1  10/2016
(Continued)

OTHER PUBLICATIONS

European Search Report for Application No. 18154649.0 dated Aug. 9, 2018, 8 pages.
(Continued)

*Primary Examiner* — Chi H Pham
*Assistant Examiner* — Weibin Huang
(74) *Attorney, Agent, or Firm* — Alston & Bird LLP

(57) ABSTRACT

According to an example aspect, there is provided an apparatus comprising at least one processor and at least one memory including computer program code, with the at least one memory and the computer program code being configured to, with the at least one processor, cause the apparatus at least to obtain information characterizing physical surroundings of the apparatus, transmit the information characterizing the physical surroundings to a network entity, and responsive to the transmission, receive provisioning information and associate the apparatus with the provisioning information

20 Claims, 6 Drawing Sheets

(51) Int. Cl.
| | |
|---|---|
| *H04W 4/02* | (2018.01) |
| *G01S 19/37* | (2010.01) |
| *H04W 4/80* | (2018.01) |
| *H04L 29/06* | (2006.01) |
| *H04B 17/318* | (2015.01) |
| *H04W 12/08* | (2021.01) |
| *H04L 29/08* | (2006.01) |
| *H04W 12/00* | (2021.01) |

(52) U.S. Cl.
CPC .......... *H04L 63/0807* (2013.01); *H04L 67/20* (2013.01); *H04W 4/025* (2013.01); *H04W 4/80* (2018.02); *H04W 8/22* (2013.01); *H04W 12/0023* (2019.01); *H04W 12/00503* (2019.01); *H04W 12/08* (2013.01); *H04W 12/004* (2019.01)

(58) Field of Classification Search
CPC ......... H04W 12/08; H04W 4/50; H04W 4/80; H04W 12/00503; H04W 12/0023; H04W 12/004
See application file for complete search history.

(56) References Cited

U.S. PATENT DOCUMENTS

| | | | |
|---|---|---|---|
| 9,749,844 B1* | 8/2017 | Sovani | H04W 8/005 |
| 9,913,143 B1* | 3/2018 | Roche | H04W 12/0023 |
| 2016/0227371 A1* | 8/2016 | Wang | H04W 4/023 |
| 2017/0134553 A1* | 5/2017 | Jeon | G06F 3/04886 |
| 2017/0155703 A1* | 6/2017 | Hao | H04L 67/12 |
| 2017/0208039 A1* | 7/2017 | Godfrey | H04L 12/4633 |
| 2017/0359338 A1* | 12/2017 | Tschofenig | G06F 21/34 |
| 2018/0132092 A1* | 5/2018 | Choi | H04W 4/80 |

FOREIGN PATENT DOCUMENTS

| | | | | |
|---|---|---|---|---|
| WO | WO 2017/005961 A1 | 1/2017 | | |
| WO | WO-2017005961 A1 * | 1/2017 | ............ | H04W 12/06 |
| WO | WO 2017/053048 A | 3/2017 | | |
| WO | WO-2017053048 A1 * | 3/2017 | ............ | H04L 67/42 |

OTHER PUBLICATIONS

Announcing New Functionality to Automatically Provision Devices to Azure IoT Hub, Microsoft Azure (Apr. 20, 2017) 4 pages.
Using Oracle Internet of Things Cloud Service, Oracle® Cloud (Aug. 2017) 378 pages.

* cited by examiner

| | |
|---|---|
| 210a | 220a |
| 210b | 220b |
| 210c | 220c |
| 210d | 220d |
| 210e | 220e |
| 210f | 220f |
| 210g | 220g |
| 210h | 220h |

FIGURE 2

DEVICE PROVISIONING FOR ASSOCIATION WITH A USER OR A USER ACCOUNT

CROSS-REFERENCE TO RELATED APPLICATIONS

This application claims priority to European Patent Application No. 18154649.0, filed Feb. 1, 2018, the entire contents of which are incorporated herein by reference.

FIELD

The present invention relates to management of connected devices.

BACKGROUND

An increasingly diverse set of devices is being provided with communications capabilities. For example, instead of requiring manual reading of meters, automatic meters may be used which report their measurement results without human intervention, using a suitable communications technology. Internet of Things, IoT, is an umbrella term with which it is referred to an interconnected network of electronic devices, known as IoT devices. IoT devices may be enabled to reach the network via another device, or IoT devices may themselves have, for example, a cellular data communications capability.

SUMMARY

The invention is defined by the features of the independent claims. Some specific embodiments are defined in the dependent claims.

According to a first aspect of the present invention, there is provided an apparatus comprising at least one processing core, at least one memory including computer program code, the at least one memory and the computer program code being configured to, with the at least one processing core, cause the apparatus at least to obtain information characterizing physical surroundings of the apparatus, transmit the information characterizing the physical surroundings to a network entity, and responsive to the transmission, receive provisioning information and associate the apparatus with the provisioning information.

Various embodiments of the first aspect may comprise at least one feature from the following bulleted list:
- information characterizing the physical surroundings comprises at least one of the following: a non-cellular access point identity detectable in the physical surroundings, a low-power radio node identity detectable in the physical surroundings, a low-power radio node advertisement, a signal strength of a signal originating in the access point and a signal strength of a signal originating in the low-power radio node
- the information characterizing the physical surroundings comprises at least one of the following: at least one cellular base station identity, and at least one received signal strength indicator relating to a signal from the at least one cellular base station
- the information characterizing the physical surroundings comprises geographic coordinates of the physical surroundings or information relating to an ultrasound beacon
- the apparatus is configured to obtain the geographic coordinates from satellite positioning circuitry comprised in the apparatus
- the apparatus is further configured to receive, from a user device, a token, and to provide the token to the network entity
- the network entity comprises a cloud service
- the apparatus is configured to transmit the information characterizing the physical surroundings by using a cellular communication transceiver of the apparatus
- the provisioning information comprises at least one of: an embedded subscriber identity module provisioning information, an account identity and an account password According to a second aspect of the present invention, there is provided an apparatus comprising at least one processing core, at least one memory including computer program code, the at least one memory and the computer program code being configured to, with the at least one processing core, cause the apparatus at least to receive information characterizing physical surroundings of a node, determine, based at least partly on the information, a user or a user account, and transmit provisioning information to the node.

Various embodiments of the second aspect may comprise at least one feature from the following bulleted list:
- the information characterizing the physical surroundings comprises at least one of the following: a non-cellular access point identity detectable in the physical surroundings, a low-power radio node identity detectable in the physical surroundings, a low-power radio node advertisement, a signal strength of a signal originating in the access point and a signal strength of a signal originating in the low-power radio node
- the information characterizing the physical surroundings comprises at least one of the following: at least one cellular base station identity and at least one received signal strength indicator relating to a signal from the at least one cellular base station
- the information characterizing the physical surroundings comprises geographic coordinates of the physical surroundings or information relating to an ultrasound beacon
- the apparatus is further configured to determine the user or user account at least partly on a token received from the node, the token being associated with the user or user account
- the apparatus is configured to determine the user or the user account by determining a user device in the physical surroundings, the user device being a user device of the user or the user device being enabled to access the user account
- transmit provisioning information to the node after receipt of user's confirmation to associate the node with himself, or his/her account, or his/her application as response to a notification transmitted from the apparatus According to a third aspect of the present invention, there is provided a method comprising obtaining, in an apparatus, information characterizing physical surroundings of the apparatus, transmitting the information characterizing the physical surroundings to a network entity, and responsive to the transmission, receiving provisioning information and associating the apparatus with the provisioning information.

Various embodiments of the third aspect may comprise at least one feature corresponding to a feature from the preceding bulleted list laid out in connection with the first aspect.

According to a fourth aspect of the present invention, there is provided a method, comprising receiving information characterizing physical surroundings of a node, determining, based at least partly on the information, a user or a user account, and transmitting provisioning information to the node.

Various embodiments of the fourth aspect may comprise at least one feature corresponding to a feature from the preceding bulleted list laid out in connection with the second aspect.

According to a fifth aspect of the present invention, there is provided an apparatus comprising means for obtaining, in an apparatus, information characterizing physical surroundings of the apparatus, means for transmitting the information characterizing the physical surroundings to a network entity, and means for receiving, responsive to the transmission, provisioning information and for associating the apparatus with the provisioning information.

According to a sixth aspect of the present invention, there is provided an apparatus comprising means for receiving information characterizing physical surroundings of a node, means for determining, based at least partly on the information, a user or a user account, and means for transmitting provisioning information to the node.

According to a seventh aspect of the present invention, there is provided a non-transitory computer readable medium having stored thereon a set of computer readable instructions that, when executed by at least one processor, cause an apparatus to at least obtain, in an apparatus, information characterizing physical surroundings of the apparatus, transmit the information characterizing the physical surroundings to a network entity, and responsive to the transmission, receive provisioning information and associate the apparatus with the provisioning information.

According to an eighth aspect of the present invention, there is provided a non-transitory computer readable medium having stored thereon a set of computer readable instructions that, when executed by at least one processor, cause an apparatus to at least receive information characterizing physical surroundings of a node, determine, based at least partly on the information, a user or a user account, and transmit provisioning information to the node.

According to a ninth aspect of the present invention, there is provided a computer program configured to cause a method in accordance with either the third or the fourth aspect to be performed.

According to a further aspect of the present invention, there is provided an apparatus comprising at least one processing core, at least one memory including computer program code, the at least one memory and the computer program code being configured to, with the at least one processing core, cause the apparatus at least to transmit information relating to information characterizing physical surroundings of the apparatus to a requesting node, receiving a notification relating to the transmitted information relating to the information characterizing the physical surroundings of the apparatus from a network entity, and responsive to the received notification transmit to the network entity an acceptance of transmitting the provisioning information from the network entity to the node and to associate the node with the provisioning information.

BRIEF DESCRIPTION OF THE DRAWINGS

FIG. 2 illustrates an example data structure;

EMBODIMENTS

A device, such as an IoT device, may gather information characterizing physical surroundings of the device and provide these to a network entity, which may use this information to associate the IoT device with a user account, or with a user. For example, the provided information may comprise an identity of a node that is already associated with the user account, or user. Thus the device may be associated with the user account or user without the need to configure the association by hand, since proximity to an already associated node, for example, is leveraged to make the association process easier.

Figure 1:
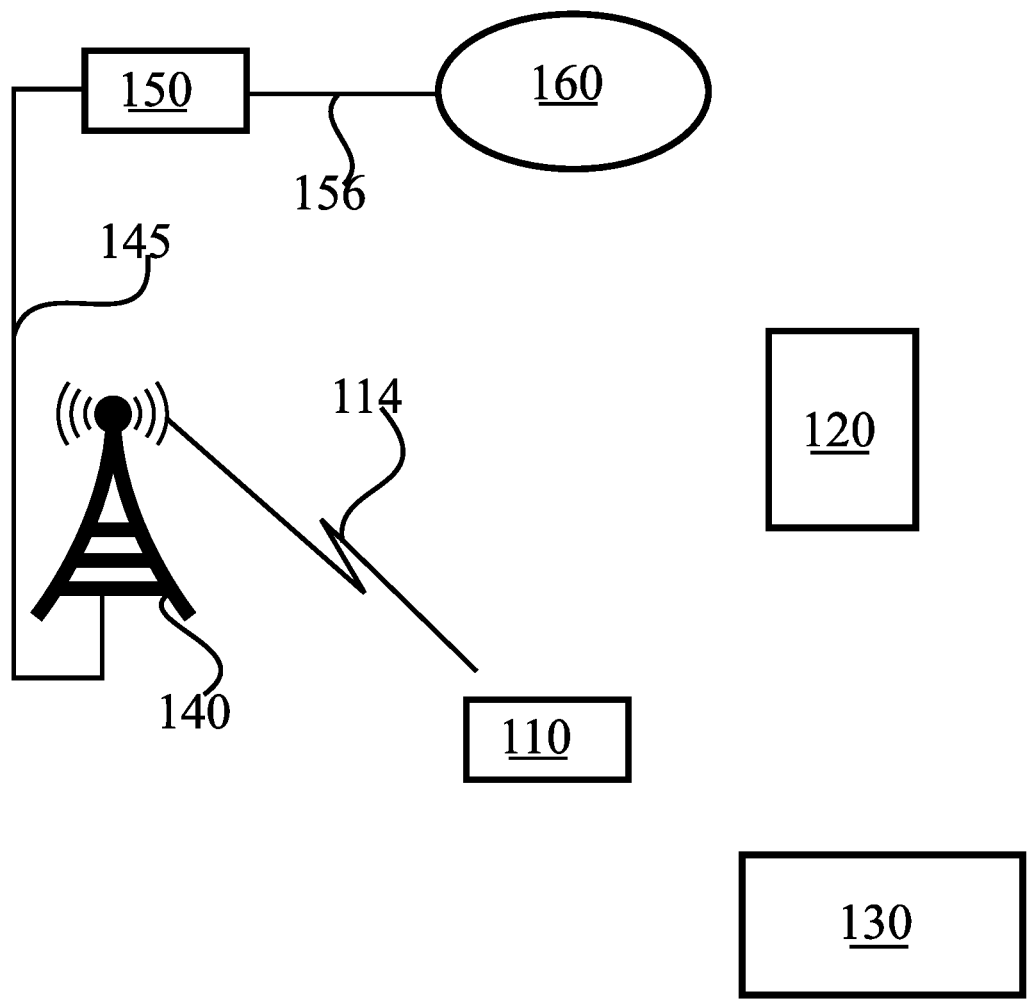
FIG. 1 illustrates an example system in accordance with at least some embodiments.

FIG. 1 illustrates an example system in accordance with at least some embodiments. Device 110 may comprise an IoT device, or another kind of connected device which may be associated with a user account or a user. For example, device 110 may comprise an activity monitor, a biosensor device, a security alarm device, a media consumption device or another kind of suitable device. In the embodiments of FIG. 1, device 110 is furnished with a cellular communications capability.

The cellular communications capability comprises an ability to communicate via cellular base stations, such as base station 140. This communication takes place over wireless link 114, which may comprise an uplink for conveying information from device 110 to base station 140, and/or a downlink for conveying information from base station 140 to device 110. Base station 140 and device 110 are configured to operate in accordance with a same cellular communication standard to enable their interoperability. Examples of cellular standards include wideband code division multiple access, WCDMA, long term evolution, LTE, and new radio, NR.

Although discussed in relation to the embodiments of FIG. 1 as a cellular communications capability, device 110 may alternatively, or in addition, have a non-cellular communications capability. A non-cellular communications capability comprises an ability to form a wireless link, with uplink and/or downlink, with a non-cellular access point. In this regard, low-power technologies such as Bluetooth are not considered non-cellular communications capabilities. Examples of non-cellular technologies include wireless local area network, WLAN, and worldwide interoperability for microwave access, WiMAX. Whether via a cellular or non-cellular capability, device 110 is enabled to communicate with a broader network, such as, for example, the Internet.

Smartphone 120 is an example of a user device that may be associated with a user account. A smartphone may be enabled to communicate via a cellular communication network to provide services to the user. Services may include voice telephony, video calls, Internet browsing, remote banking and/or other services, for example. In the embodiments of FIG. 1, smartphone 120 is optional in the sense that the provisioning process described herein would work also without it. Smartphone 120 may be enabled to connect to a network in which base station 140 is comprised, or to a different cellular network.

In systems where device 110 would lack a cellular or non-cellular communications capability, device 110 could be connected with a broader network via smartphone 120, for example by establishing a low-power connection between device 110 and smartphone 120. In such a case, device 110 could be associated with the user account or user of smartphone 120, since connectivity would traverse smartphone 120 and the two units would share a communications connection. However, where device 110 connects directly to a broader network in the sense that it doesn't need smartphone 120 to reach the broader network, device 110 does not necessarily have a connection with smartphone 120, and associating device 110 with the user account or user is not as straightforward. Narrowband IoT and/or LTE-M, long term evolution for machines, may be used in this regard to facilitate associating device 110 with the entity account, user account or user.

Node 130 is a device which is associated, directly or indirectly, with a user account or user. For example, node 130 may be a non-cellular access point, such as a residential WLAN access point, which is configured to provide connectivity to devices at a home of a specific user or users, for example family members. As another example, node 130 may comprise a low-power radio node, such as a Bluetooth or Bluetooth Low Energy node, which is associated with a user account.

When a user first takes device 110 into use, he may wish to associate it with his user account, or with his person. Rather than configuring the user account information, or user information, by hand using a user interface of device 110, the user may leverage the fact that he may have one or more devices already associated, which may be used to make associating device 110 easier. In some embodiments, this may even have the benefit that device 110 need not have a user interface itself, or the user interface of device 110 may be simplified if it need not be enabled to feed user or user account configuration data.

In use, device 110 may monitor its surroundings for information characterizing physical surroundings of device 110. Examples of data that may be comprised in such information include a non-cellular access point identity detectable in the physical surroundings, a low-power radio node identity detectable in the physical surroundings, a low-power radio node advertisement, a signal strength of a signal originating in the access point and a signal strength of a signal originating in the low-power radio node. The non-cellular access point identity may comprise a WLAN access point identity, which may be a service set identity, SSID or basic service set identity, BSSID, for example. A low-power radio node identity may comprise a Bluetooth or Bluetooth Low Energy identity, for example. In general the information characterizing the physical surroundings of device 110 may comprise information on electromagnetic waves, such as radio waves, or ultrasound waves, for example. Further, an application identity in smartphone 120 may be comprised in the information characterizing physical surroundings of device 110. Such an application identity may comprise a user account information identity of the application, secured such that a network entity may understand it. Further examples include an operating system identity and/or version, such as, for example, Android, iOS or Windows Phone software version of smartphone 120. A node 130 operating system and/or version information may also be included in the information characterizing physical surroundings of device 110.

Further examples of the information characterizing the physical surroundings comprises at least one of the following: at least one a cellular base station identity and at least one received signal strength indicator relating to a signal from at least one cellular base station. A list of detectable cellular base stations, or non-cellular access points, gives an understanding of the whereabouts of device 110. When supplemented with the received signal strength indicators, a more accurate estimate of the location of device 110 is obtained. The received signal strength indicators may relate to strengths of signals from cellular base stations detectable by device 110. A list of detectable cellular base stations, possibly supplemented with the received signal strength indicators, may be referred to as a cellular fingerprint. Cellular fingerprints may be usable, for example, in assisting detection of local microcells or picocells.

Yet further examples of the information characterizing the physical surroundings comprise geographic coordinates of the physical surroundings, or information relating to an ultrasound beacon. Geographic coordinates may be obtained by device 110 by using a satellite positioning receiver. Examples of satellite positioning constellations include the global positioning system, GPS, and Galileo constellations. The ultrasound beacon may be received using a microphone of device 110, for example.

Monitoring the surroundings may comprise listening, using radio capabilities of device 110, for detectable radio emissions in the surroundings. For example, device 110 may use each of its radio transceivers in turn, or substantially simultaneously, to form a diverse understanding of the physical surroundings. Similarly, a satellite positioning receiver and/or a microphone may be used, for example.

Once device 110 has obtained the information characterizing its physical surroundings, it may transmit it, in whole or in part, to a network entity, such as a cloud service or server, for example. The network entity may assess the information to attempt to associate a user account or user with the information it received from device 110. An example network entity is illustrated in FIG. 1 as network entity 160, reachable from device 110 via wireless link 114, base station 140, link 145, network node 150 and link 156. Network node 150 may comprise a gateway or switch, for example. In general, network entity 160 may comprise a user information repository or ecosystem element with which the user is associated in terms of obtaining services, such as data storage, content updates and/or email services.

In some embodiments, the information device 110 provides to network entity 160 comprises a type of device 110. For example, the type may comprise a pedometer, cardiac monitor, media consumption device, smart meter, vehicle, or security alarm device. A security alarm device may be used by senior citizens to summon assistance, for example. A type of device may comprise, or be comprised in, an identifier of device 110 that device 110 provides to network entity 160, for example.

For example, where the information comprises a non-cellular access point identity registered to a user, the network entity 160 may thereby associate the user with the information received from device 110 in case network entity 160 has access to the information associating the non-cellular access point identity to the user. Likewise, where the non-cellular access point has been exclusively or mostly used by a same user, or to access a same user account, the network entity may associate the information it has received from device 110 with the corresponding user or user account.

Where the information comprises a low-power radio node identity, for example of node 130, the network entity may assess whether this identity may be associated with user or user account, for example in case the low-power radio node is associated with a device of the user. An example of this is where the low-power radio node is a Bluetooth headset paired with a smartphone 120 that has an active session with a user account. In case signal strengths are comprised in the information received from device 110, the network entity may primarily use the access point or low-power node identities associated with the highest signal strengths, since they are likely to be closer to device 110.

Where the information comprises a cellular fingerprint or geographic coordinates, the network entity may assess, whether it can associate this fingerprint or location with a user or user account in an unambiguous way. This may be possible where the user is in an area where there are not very many other users, and therefore the location or fingerprint may provide an identification of the user and/or account. To facilitate comparison of cellular fingerprints, a smartphone 120 of the user may send to the network entity 160 cellular fingerprint information of its surroundings, to use as comparison material. Device 110 may be well enabled to compile cellular fingerprint information in cases where device 110 is cellular-capable.

In general, a user device such as node 130 and/or smartphone 120 may be arranged, or configured to by the user, to transmit a signal to network entity 160 to inform the network entity that an association process is ongoing or imminent. This would facilitate the task of the network entity, since the network entity can then search for suitable user or user account information identified by above mentioned way to associate with the information from device 110 from a set of user or user account data that have indicated association is ongoing or imminent. This is expected, at any given time, to be a small fraction of the overall mass of user or user account information.

In some embodiments, device 110 is configured to transmit a beacon, responsive to which node 130 and/or smartphone 120 transmit the signal to the network entity to inform the network entity that the association process is ongoing or imminent. In some embodiments, device 110 is configured to transmit a request beacon, requesting nearby nodes to transmit information suitable in facilitating association. Examples of such information include Bluetooth or Bluetooth Low Energy advertisements, ultrasound beacons and geo-location information. In some embodiments, device 110 is configured to transmit both the request beacon and the beacon requesting the other nodes to provide the signal to the network entity. The signal to the network entity may comprise an identifier of a user or of a user account.

In some embodiments device 110 is configured to device, for how long it will gather the information characterizing its physical surroundings. This information may be gathered in connection with powering device 110 on, for example for the first time, or when there is no user or user account information associated with device 110. The length of time device 110 spends gathering the information may be adjusted based on supported connectivity techniques, which relate to scanning possibilities.

Device 110 may have a setting relating to when an application programming interface, API is called for sending the gathered information to the network entity. Device 110 may select a minimum scanning time, or the maximum scanning time, or more generally scanning time, may be selected by the network entity, for example based on a location of device 110. In some embodiments, the network entity may request device 110 to scan more, to obtain more information characterizing the physical surroundings, responsive to an inconclusive result with the information device 110 initially provides to the network entity. In some embodiments, device 110 is configured to determine, when the minimum or maximum amount of information characterizing the physical surroundings has been gathered, and to responsively transmit the information to the network entity.

In some embodiments, device 110 is configured to check its battery level, and to conditionally abort the scanning in case the battery level is below a preconfigured threshold level. The threshold level may be set based on an amount of energy deemed necessary to complete the scanning.

Once the network entity has associated the information it has received from device 110 with the user or the user account, it may provide provisioning information to device 110, for example via the cellular network comprising base station 140. The provisioning information may comprise, for example, at least one of an embedded subscriber identity module provisioning information, an account identity and an account password. In some embodiments, network entity 160 associates, based at least partly on the information received, device 110 with more than one user account and/or with more than one user.

In one embodiment, an account can include, for example, family members or their devices, such as smart phones, which may receive provisioning information when and if the account settings allow this kind of function, if only one group member has provided information. In some embodiments the provisioning information may be distributed to all necessary devices of the account. The account may comprise enterprise or community based groups.

Prior to providing the provisioning information to device 110, the network entity may provide a notification to smartphone 120, or another device of the user with whom, or with whose user account, the information from device 110 was associated in network entity 160. The notification may comprise a type and/or identity of device 110. Network entity 160 may then provide the provisioning information to device 110 only once the user confirms his intent is to associate a device of the type of device 110 with himself, or with his account and/or his/her application of smartphone 120.

In some embodiments, once the user accepts a notification from network entity 160, the user device, such as smartphone 120, may provide a token to device 110 using, for example, a short-range radio technology, which device 110 will then forward to network entity 160 to further confirm the association is correct. The token may comprise suitable cryptographic information enabling network entity 160 to verify it originates in the user device.

The smart phone 120 may transmit information relating to information characterizing physical surroundings of the smart phone to a device 110. Smart phone may receive a notification relating to the transmitted information relating to the information characterizing the physical surroundings of smart phone 120 from network entity 160, and responsive to the received notification smart phone 120 may transmit to the network entity 160 an acceptance of transmitting the provisioning information from network entity 160 to device 110 and to associate device 110 with the provisioning information.

FIG. 2 illustrates an example data structure. The data structure may be a structure of the information characterizing physical surroundings of device 110, for example. In the illustrated structure, elements 210a, 210b, 210c, 210d, 210e, 210f, 210g and 210h are type descriptors, defining a type of an associated data element. For example, element 210a may indicate an associated data element 220a is a non-cellular access point identity, for example. Examples of different types of information, and thus types of data elements, which may be comprised in the information device 110 sends to the network entity have been described above in connection with FIG. 1. Data elements 220a, 220b, 220c, 220d, 220e, 220f, 220g and 220h are the payload data and carry the information device 110 has gleaned of its physical surroundings. Thus, these data elements may comprise the non-cellular access point identities, cellular fingerprint data, ultrasound beacon or Bluetooth beacon data, and so on, as described herein above. Further, smart phone operating system, operating system version number, application identity, application version number, country, clock etc. may be used to further specify the request. It may also be that the device 110 can get one virtual assistant ID like from Home-Pod, Amazon Echo and Google Home type devices. The server may associate with the user account or user based on, for example, smart phone identity, account identity and virtual assistant identity. When the virtual assistant has already been associated with the smart phone then this association can be used as trusted and predict with which device 110 should be associated.

Figure 3:
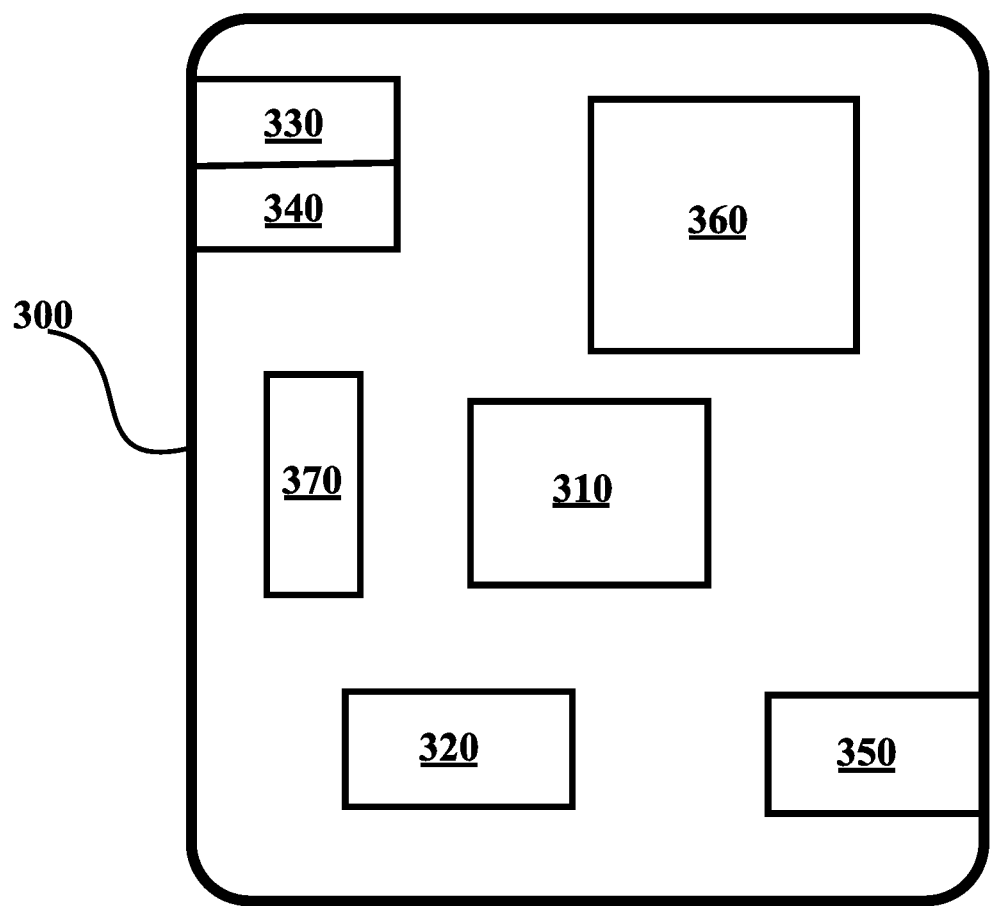
FIG. 3 illustrates an example apparatus capable of supporting at least some embodiments.

FIG. 3 illustrates an example apparatus capable of supporting at least some embodiments. Illustrated is device 300, which may comprise, in suitable parts, for example a device such as device 110 or network entity 160 of FIG. 1. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a short range communication, SRC, transceiver 350. SRC transceiver 350 may support at least one SRC technology, such as NFC, Bluetooth, Bluetooth Low Energy or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. An example of a SIM is an embedded SIM. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300. The provisioning information may relate to provisioning a SIM or SIM functionality of device 110 of FIG. 1.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a SRC transceiver 350 and/or user identity module 370.

Processor 310, memory 320, transmitter 330, receiver 340, SRC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
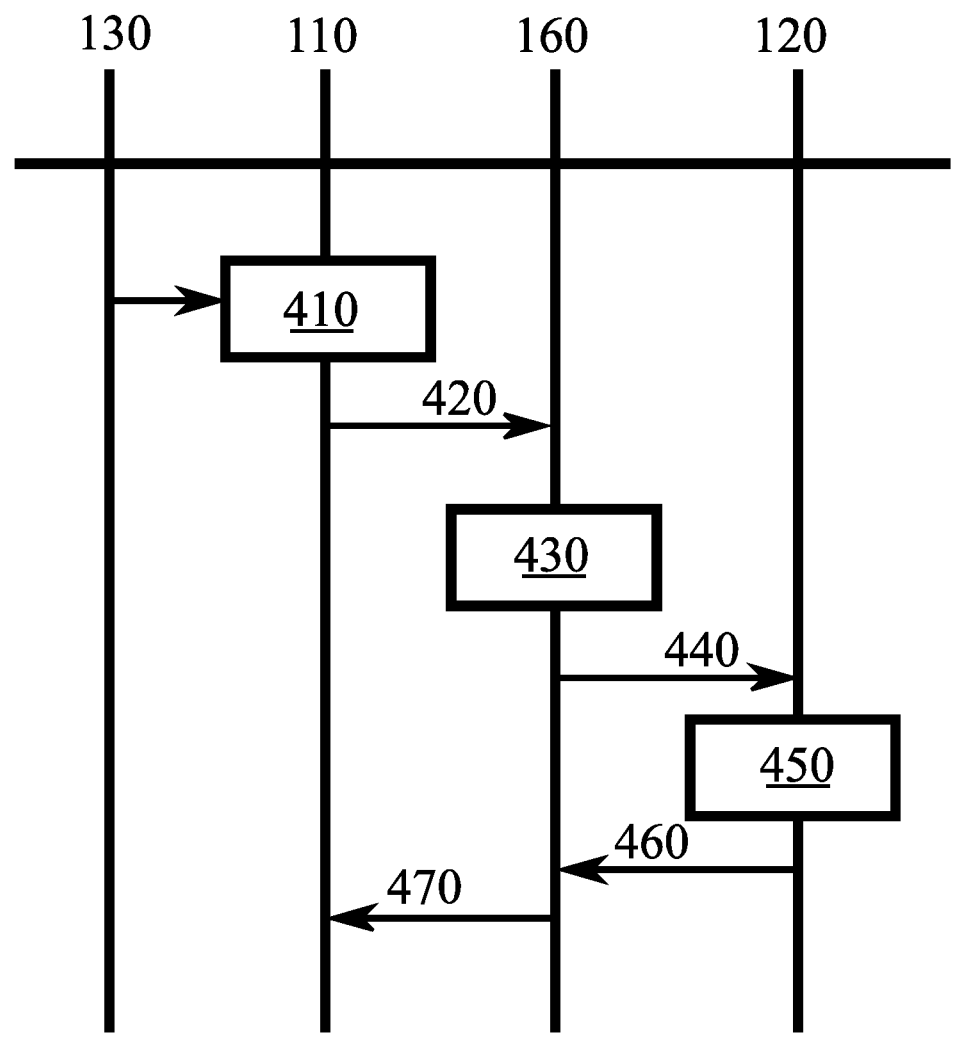
FIG. 4 illustrates signaling in accordance with at least some embodiments.

FIG. 4 illustrates signaling in accordance with at least some embodiments. On the vertical axes are disposed, from the left, node 130, device 110, network entity 160 and smartphone 120 of FIG. 1. Time advances from the top toward the bottom.

Phase 410 comprises device 110 gathering information characterizing its physical surroundings. This may comprise gathering information using at least one radio receiver, and/or at least one microphone, as described herein above. During this phase node 130 transmits a beacon that device 110 receives. The beacon may comprise, for example, a Bluetooth or Bluetooth low energy beacon transmission, with characterizing information. The beacon is illustrated in FIG. 4 as an arrow from node 130 to phase 410 in device 110.

In phase 420, device 110 transmits to network entity 160 information it has obtained in phase 410. The information may comprise information from the beacon from node 130 and, optionally, other information as well. Responsively, in phase 430, network entity 160 seeks to associate the information it has received in phase 420 with a user or user account. In this example case, the beacon from node 130 enables network entity 160 to associate the information with a specific user account.

In phase 440, network entity 160 provides a notification to a smartphone 120, which is a user device associated with the user account. The notification informs smartphone 120 that an associating match has been found. The notification may comprise a type of device 110, which network entity 160 may have received in phase 420 as part of the information provided by device 110.

In phase 450, smartphone 120 inquiries from the user, whether he wishes to authorize the association formed in network entity 160. For example, a prompt may inquire from the user "OK TO ASSOCIATE DEVICE OF TYPE—PEDOMETER3000—WITH YOUR ACCOUNT?" If the user is in the process of taking a device of this type, namely device 110, into use, he will probably authorize the association.

Responsive to a positive response from the user, smartphone 120 informs network entity 160 of the positive response, phase 460, and the network entity 160 will then as a response to the message of phase 460 provide the provisioning information to device 110, in phase 470.

Figure 5:
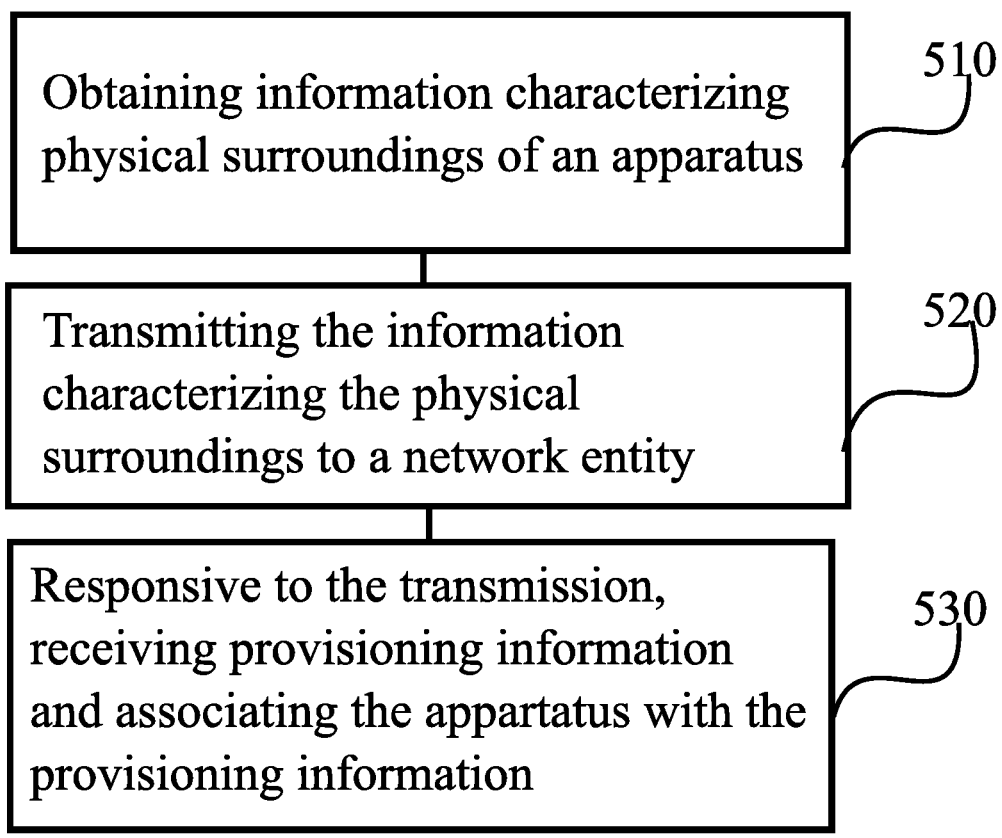
FIG. 5 is a flow graph of a method in accordance with at least some embodiments.

FIG. 5 is a flow graph of a method in accordance with at least some embodiments. The phases of the illustrated method may be performed in device 110, an auxiliary device or a personal computer, for example, or in a control device configured to control the functioning thereof, when installed therein.

Phase 510 comprises obtaining, in an apparatus, information characterizing physical surroundings of an apparatus. Phase 510 may take place while the apparatus is in a state where the apparatus is not associated with a user or user account. Phase 520 comprises transmitting the information characterizing the physical surroundings to a network entity. Phase 530 comprises, responsive to the transmission, receiving provisioning information and associating the apparatus with the provisioning information. Phase 530 may comprise receiving provisioning information associating the apparatus with a user or a user account.

Figure 6:
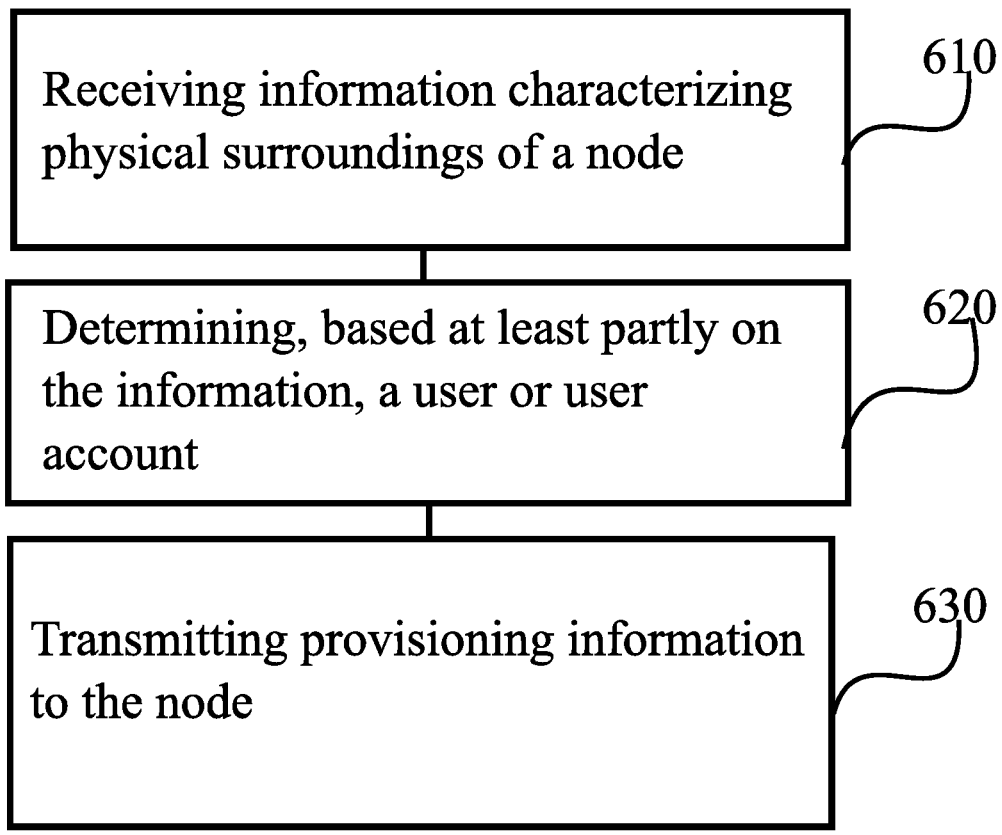
FIG. 6 is a flow graph of a method in accordance with at least some embodiments.

FIG. 6 is a flow graph of a method in accordance with at least some embodiments of the present invention. The phases of the illustrated method may be performed in network entity 160, an auxiliary device or a personal computer, for example, or in a control device configured to control the functioning thereof, when installed therein.

Phase 610 comprises receiving information characterizing physical surroundings of a node. Phase 620 comprises determining, based at least partly on the information, a user or user account. Finally, phase 630 comprises transmitting provisioning information to the node. The provisioning information may associate the node with the user or the user account. In some embodiments, the provisioning information is transmitted only once a user has approved the provisioning, for example via a user interface dialogue.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

1. An apparatus comprising at least one processing core, at least one memory including computer program code, the at least one memory and the computer program code being configured to, with the at least one processing core, cause the apparatus at least to: obtain information characterizing physical surroundings of the apparatus; transmit the information characterizing the physical surroundings to a network entity, and responsive to the transmission, receive provisioning information and associate the apparatus with the provisioning information.

2. The apparatus according to claim 1, wherein the information characterizing the physical surroundings comprises at least one of the following: a non-cellular access point identity detectable in the physical surroundings, a low-power radio node identity detectable in the physical surroundings, a low-power radio node advertisement, a signal strength of a signal originating in the access point and a signal strength of a signal originating in the low-power radio node.

3. The apparatus according to claim 1 or 2, wherein the information characterizing the physical surroundings comprises at least one of the following: at least one cellular base station identity, and at least one received signal strength indicator relating to a signal from the at least one cellular base station.

4. The apparatus according to any of claims 1-3, wherein the information characterizing the physical surroundings comprises geographic coordinates of the physical surroundings or information relating to an ultrasound beacon.

5. The apparatus according to claim 4, wherein the apparatus is configured to obtain the geographic coordinates from satellite positioning circuitry comprised in the apparatus.

6. The apparatus according to any of claims 1-5, wherein the apparatus is further configured to receive, from a user device, a token, and to provide the token to the network entity.

7. The apparatus according to any of claims 1-6, wherein the network entity comprises a cloud service.

8. The apparatus according to any of claims 1-7, wherein the apparatus is configured to transmit the information characterizing the physical surroundings by using a cellular communication transceiver of the apparatus.

9. The apparatus according to any of claims 1-8, wherein the provisioning information comprises at least one of: an embedded subscriber identity module provisioning information, an account identity and an account password.

10. An apparatus comprising at least one processing core, at least one memory including computer program code, the at least one memory and the computer program code being configured to, with the at least one processing core, cause the apparatus at least to: receive information characterizing physical surroundings of a node, determine, based at least partly on the information, a user or a user account, and transmit provisioning information to the node.

11. The apparatus according to claim 10, wherein the information characterizing the physical surroundings comprises at least one of the following: a non-cellular access point identity detectable in the physical surroundings, a low-power radio node identity detectable in the physical surroundings, a low-power radio node advertisement, a signal strength of a signal originating in the access point and a signal strength of a signal originating in the low-power radio node.

12. The apparatus according to claim 10 or 11, wherein the information characterizing the physical surroundings comprises at least one of the following: at least one cellular base station identity and at least one received signal strength indicator relating to a signal from the at least one cellular base station.

13. The apparatus according to any of claims 10-12, wherein the information characterizing the physical surroundings comprises geographic coordinates of the physical surroundings or information relating to an ultrasound beacon.

14. The apparatus according to any of claims 10-13, wherein the apparatus is further configured to determine the user or user account at least partly on a token received from the node, the token being associated with the user or user account.

15. The apparatus according to any of claims 10-14, wherein the apparatus is configured to determine the user or the user account by determining a user device in the physical surroundings, the user device being a user device of the user or the user device being enabled to access the user account.

16. A method comprising: obtaining, in an apparatus, information characterizing physical surroundings of the apparatus; transmitting the information characterizing the physical surroundings to a network entity, and responsive to the transmission, receiving provisioning information and associating the apparatus with the provisioning information.

17. The method according to claim 16, wherein the information characterizing the physical surroundings comprises at least one of the following: a non-cellular access point identity detectable in the physical surroundings, a low-power radio node identity detectable in the physical surroundings, a low-power radio node advertisement, a signal strength of a signal originating in the access point and a signal strength of a signal originating in the low-power radio node.

18. The method according to claim 16 or 17, wherein the information characterizing the physical surroundings comprises at least one of the following: at least one cellular base station identity, at least one received signal strength indicator relating to a signal from the at least one cellular base station.

19. The method according to any of claims 16-18, wherein the information characterizing the physical surroundings comprises geographic coordinates of the physical surroundings or information relating to an ultrasound beacon.

20. The method according to claim 19, further comprising obtaining the geographic coordinates from satellite positioning circuitry comprised in the apparatus.

21. The method according to any of claims 16-20, further comprising receiving, from a user device, a token, and providing the token to the network entity.

22. The method according to any of claims 16-21, wherein the network entity comprises a cloud service.

23. The method according to any of claims 16-22, further comprising transmitting the information characterizing the physical surroundings by using a cellular communication transceiver of the apparatus.

24. The method according to any of claims 16-23, wherein the provisioning information comprises at least one of: an embedded subscriber identity module provisioning information, an account identity and an account password.

25. A method, comprising: receiving information characterizing physical surroundings of a node, determining, based at least partly on the information, a user or a user account, and transmitting provisioning information to the node.

26. The method according to claim 25, wherein the information characterizing the physical surroundings comprises at least one of the following: a non-cellular access point identity detectable in the physical surroundings, a low-power radio node identity detectable in the physical surroundings, a low-power radio node advertisement, a signal strength of a signal originating in the access point and a signal strength of a signal originating in the low-power radio node.

27. The method according to claim 25 or 26, wherein the information characterizing the physical surroundings comprises at least one of the following: at least one cellular base station identity, at least one received signal strength indicator relating to a signal from the at least one cellular base station.

28. The method according to any of claims 25-27, wherein the information characterizing the physical surroundings comprises geographic coordinates of the physical surroundings or information relating to an ultrasound beacon.

29. The method according to any of claims 25-28, further comprising determining the user or user account at least partly on a token received from the node, the token being associated with the user or user account.

30. The method according to any of claims 25-29, further comprising determining the user or the user account by determining a user device in the physical surroundings, the user device being a user device of the user or the user device being enabled to access the user account.

31. An apparatus comprising: means for obtaining, in an apparatus, information characterizing physical surroundings of the apparatus; means for transmitting the information characterizing the physical surroundings to a network entity, and means for receiving, responsive to the transmission, provisioning information and for associating the apparatus with the provisioning information.

32. An apparatus comprising: means for receiving information characterizing physical surroundings of a node, means for determining, based at least partly on the information, a user or a user account, and means for transmitting provisioning information to the node.

33. A non-transitory computer readable medium having stored thereon a set of computer readable instructions that, when executed by at least one processor, cause an apparatus to at least: obtain, in an apparatus, information characterizing physical surroundings of the apparatus; transmit the information characterizing the physical surroundings to a network entity, and responsive to the transmission, receive provisioning information and associate the apparatus with the provisioning information.

34. A non-transitory computer readable medium having stored thereon a set of computer readable instructions that, when executed by at least one processor, cause an apparatus to at least: receive information characterizing physical surroundings of a node, determine, based at least partly on the information, a user or a user account, and transmit provisioning information to the node.

35. A computer program configured to cause a method in accordance with at least one of claims 16-24 or 25-30 to be performed.

INDUSTRIAL APPLICABILITY

At least some embodiments of the present invention find industrial application in enabling device networking.

ACRONYMS LIST

BSSID basic service set identity
IoT Internet of Things
LTE long term evolution
NR new radio
SSID service set identity
WiMAX worldwide interoperability for microwave access
WCDMA wideband code division multiple access

| REFERENCE SIGNS LIST | |
|---|---|
| 110 | Device |
| 120 | Smartphone |
| 130 | Node |
| 140 | Base station |
| 150 | Network node |
| 160 | Network entity |
| 114 | Wireless link |
| 145, 156 | Links |
| 210a-210h | Type descriptors |
| 220a-220h | Data elements |
| 310-370 | Structure of the apparatus of FIG. 3 |
| 410-470 | Phases of the method of FIG. 4 |
| 510-530 | Phases of the method of FIG. 5 |
| 610-630 | Phases of the method of FIG. 6 |

That which is claimed:
1. An apparatus comprising
   at least one processor; and
   at least one memory including computer program code;
   the at least one memory and the computer program code configured to, with the at least one processor, cause the apparatus at least to perform:
      obtain in the apparatus, information characterizing physical surroundings of the apparatus by controlling a scanning time of the physical surroundings, wherein the scanning time depends on a preconfigured level of gathered information of the physical surroundings;
      transmit the information characterizing the physical surroundings to a network entity for associating the apparatus with a user or a user account; and
      receive, responsive to the transmission, provisioning information for associating the apparatus with the provisioning information, wherein the provisioning information associates the apparatus with the user or the user account.

2. The apparatus according to claim 1, wherein the information characterizing the physical surroundings comprises at least one of the following: a non-cellular access point identity detectable in the physical surroundings, a low-power radio node identity detectable in the physical surroundings, a low-power radio node advertisement, a signal strength of a signal originating in the access point or a signal strength of a signal originating in the low-power radio node.

3. The apparatus according to claim 1, wherein the information characterizing the physical surroundings comprises at least one of the following: at least one cellular base station identity, or at least one received signal strength indicator relating to a signal from the at least one cellular base station.

4. The apparatus according to claim 1, wherein the information characterizing the physical surroundings comprises geographic coordinates of the physical surroundings or information relating to an ultrasound beacon.

5. The apparatus according to claim 4, wherein the apparatus is configured to obtain the geographic coordinates from satellite positioning circuitry comprised in the apparatus.

6. The apparatus according to claim 1, wherein the apparatus is further configured to receive, from a user device, a token, and to provide the token to the network entity.

7. The apparatus according to claim 1, wherein the network entity comprises a cloud service.

8. The apparatus according to claim 1, wherein the apparatus is configured to transmit the information characterizing the physical surroundings by using a cellular communication transceiver of the apparatus.

9. The apparatus according to claim 1, wherein the provisioning information comprises at least one of: an embedded subscriber identity module provisioning information, an account identity or an account password.

10. The apparatus according to claim 1, wherein obtaining information characterizing physical surroundings of the apparatus takes place while the apparatus is in a state where the apparatus is not associated with the user or the user account.

11. The apparatus according to claim 1 further cause the apparatus to associate the apparatus with the user or the user account includes an authorized response to the association from the user device or a device authorized by the account or user.

12. The apparatus according to claim 1, wherein further cause the apparatus to associate with the user account or user using smart phone identity, account identity or virtual assistant identity.

13. A method comprising:
obtaining in an apparatus, information characterizing physical surroundings of the apparatus by controlling a scanning time of the physical surroundings, wherein the scanning time depends on a preconfigured level of gathered information of the physical surroundings;
transmitting the information characterizing the physical surroundings to a network entity for associating the apparatus with a user or a user account; and
receiving responsive to the transmission, provisioning information for associating the apparatus with the provisioning information, wherein the provisioning information associates the apparatus with the user or the user account.

14. A method as claimed in claim 13, wherein the apparatus is further configured to receive, from a user device, a token, and to provide the token to the network entity.

15. A method as claimed in claim 13, wherein obtaining information characterizing physical surroundings of the apparatus takes place while the apparatus is in a state where the apparatus is not associated with the user or the user account.

16. An apparatus comprising
at least one processor; and
at least one memory including computer program code;
the at least one memory and the computer program code configured to, with the at least one processor, cause the apparatus at least to perform:
receive information characterizing physical surroundings of a device that has been obtained in accordance with a scanning time that is controlled in a manner dependent on a preconfigured level of the information gathered for the physical surroundings, wherein the information is received by the apparatus for associating the device with a user or a user account;
transmit a notification to a user device;
receive an authorization for the association from the user device; and
transmit, responsive to the reception, by the apparatus provisioning information for associating the device with the provisioning information, wherein the provisioning information associates the apparatus with the user or the user account.

17. An apparatus as claimed in claim 16, wherein the information characterizing the physical surroundings comprises at least one of the following: a non-cellular access point identity detectable in the physical surroundings, a low-power radio node identity detectable in the physical surroundings, a low-power radio node advertisement, a signal strength of a signal originating in the access point or a signal strength of a signal originating in the low-power radio node.

18. An apparatus as claimed in claim 16, wherein the apparatus is further configured to receive, from the device, a token, provided from the user device.

19. A method according to claim 13, wherein the information characterizing the physical surroundings comprises at least one of the following: a non-cellular access point identity detectable in the physical surroundings, a low-power radio node identity detectable in the physical surroundings, a low-power radio node advertisement, a signal strength of a signal originating in the access point or a signal strength of a signal originating in the low-power radio node.

20. A method according to claim 13, wherein the information characterizing the physical surroundings comprises at least one of the following: at least one cellular base station identity, or at least one received signal strength indicator relating to a signal from the at least one cellular base station.

* * * * *